US008478913B2

(12) United States Patent
Terlizzi et al.

(10) Patent No.: US 8,478,913 B2
(45) Date of Patent: Jul. 2, 2013

(54) ADAPTER FOR ELECTRONIC DEVICES

(71) Applicant: Apple Inc., Cupertino, CA (US)

(72) Inventors: Jeffrey J. Terlizzi, San Francisco, CA (US); Daniel J. Fritchman, Sunnyvale, CA (US); Scott Krueger, San Francisco, CA (US); Terry Tikalsky, Sunnyvale, CA (US); Debra A. Sillman, Mountain View, CA (US); Tony Chi Wang Ng, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/680,000

(22) Filed: Nov. 16, 2012

(65) Prior Publication Data

US 2013/0138861 A1 May 30, 2013

Related U.S. Application Data

(63) Continuation of application No. 13/607,519, filed on Sep. 7, 2012.

(60) Provisional application No. 61/565,910, filed on Dec. 1, 2011, provisional application No. 61/565,372, filed on Nov. 30, 2011, provisional application No. 61/294,423, filed on Aug. 29, 2012.

(51) Int. Cl.
*G06F 13/12* (2006.01)

(52) U.S. Cl.
USPC ............. 710/62; 710/72; 340/5.8; 713/300

(58) Field of Classification Search
USPC ............. 710/62, 316, 303, 72, 10; 340/5.8; 455/41.1–41.3; 713/300
See application file for complete search history.

(56) References Cited

U.S. PATENT DOCUMENTS

| 4,223,406 | A | | 9/1980 | Someno |
| 4,249,255 | A | | 2/1981 | Molinari |
| 4,344,186 | A | | 8/1982 | Ong |
| 5,387,110 | A | * | 2/1995 | Kantner et al. ............... 439/59 |
| 5,742,273 | A | | 4/1998 | Flinders et al. |
| 6,127,941 | A | | 10/2000 | Van Ryzin |
| 6,131,125 | A | * | 10/2000 | Rostoker et al. ............ 709/250 |

(Continued)

FOREIGN PATENT DOCUMENTS

| DE | 4410741 A1 | 9/1944 |
| DE | 3032798 A1 | 3/1981 |

(Continued)

OTHER PUBLICATIONS

Mobility Electronics. USB—Perpiheral to Ethernet Adapter. User Guide. 2005.*

(Continued)

*Primary Examiner* — Matthew D Spittle
(74) *Attorney, Agent, or Firm* — Kilpatrick Townsend & Stockton

(57) ABSTRACT

An adapter for connecting an accessory to a portable electronic device includes a first connector compatible with a connector of the portable electronic device and a second connector compatible with a connector of the accessory. The connectors of the accessory and the portable electronic device are otherwise incompatible with each other. The adapter provides two levels of authentication. First, the adapter authenticates itself to the portable electronic device. If this first authentication is successful, then the adapter authenticates the accessory to the adapter.

20 Claims, 11 Drawing Sheets

U.S. PATENT DOCUMENTS

| | | | |
|---|---|---|---|
| 6,145,035 A * | 11/2000 | Mai et al. | 710/62 |
| 6,934,561 B2 * | 8/2005 | Burrus, IV | 455/559 |
| 6,934,568 B2 | 8/2005 | Charlier et al. | |
| 7,127,541 B2 * | 10/2006 | Govindarajulu et al. | 710/300 |
| 7,269,673 B2 | 9/2007 | Kim et al. | |
| 7,280,847 B2 | 10/2007 | Goldthwaite et al. | |
| 7,305,254 B2 * | 12/2007 | Findikli | 455/557 |
| 7,305,511 B2 * | 12/2007 | Barrett et al. | 710/316 |
| 7,321,946 B2 | 1/2008 | Olson | |
| 7,548,675 B2 | 6/2009 | Tatum et al. | |
| 7,564,678 B2 * | 7/2009 | Langberg et al. | 361/679.01 |
| 7,591,657 B2 * | 9/2009 | Teicher | 439/173 |
| 7,627,343 B2 * | 12/2009 | Fadell et al. | 455/557 |
| 7,762,470 B2 * | 7/2010 | Finn et al. | 235/492 |
| 7,822,973 B2 * | 10/2010 | Okaya | 713/155 |
| 7,823,214 B2 * | 10/2010 | Rubinstein et al. | 726/34 |
| 7,831,756 B1 | 11/2010 | Fils | |
| 7,836,223 B2 | 11/2010 | Butcher | |
| 7,840,729 B2 * | 11/2010 | Inoue et al. | 710/74 |
| 8,041,300 B2 * | 10/2011 | Dorogusker et al. | 455/41.3 |
| 8,126,734 B2 * | 2/2012 | Dicks et al. | 705/2 |
| 8,161,567 B2 * | 4/2012 | Rubinstein et al. | 726/34 |
| 8,208,853 B2 * | 6/2012 | Lydon et al. | 455/41.2 |
| 8,238,811 B2 * | 8/2012 | Lydon | 455/3.03 |
| 8,275,924 B2 * | 9/2012 | Krueger et al. | 710/303 |
| 8,280,465 B2 * | 10/2012 | Dorogusker et al. | 455/575.3 |
| 8,296,587 B2 * | 10/2012 | Paniagua et al. | 713/300 |
| 8,369,785 B2 * | 2/2013 | Dorogusker et al. | 455/41.3 |
| 2002/0003471 A1 | 1/2002 | Troedel et al. | |
| 2002/0032813 A1 | 3/2002 | Hosaka et al. | |
| 2004/0072544 A1 | 4/2004 | Alexis | |
| 2004/0127256 A1 | 7/2004 | Goldthwaite et al. | |
| 2004/0151327 A1 | 8/2004 | Marlow | |
| 2005/0044372 A1 | 2/2005 | Aull et al. | |
| 2005/0070157 A1 | 3/2005 | Neo et al. | |
| 2005/0157458 A1 | 7/2005 | Yin et al. | |
| 2005/0224589 A1 | 10/2005 | Park et al. | |
| 2005/0266879 A1 | 12/2005 | Spaur et al. | |
| 2006/0053447 A1 | 3/2006 | Krzyzanowski et al. | |
| 2007/0015457 A1 | 1/2007 | Krampf et al. | |
| 2007/0086724 A1 * | 4/2007 | Grady et al. | 386/46 |
| 2007/0087725 A1 | 4/2007 | Anderson | |
| 2008/0097911 A1 | 4/2008 | Dicks et al. | |
| 2008/0163049 A1 | 7/2008 | Krampf | |
| 2008/0198264 A1 | 8/2008 | Balram | |
| 2008/0214237 A1 | 9/2008 | Cupps et al. | |
| 2008/0221715 A1 | 9/2008 | Krzyzanowski et al. | |
| 2008/0227393 A1 | 9/2008 | Tang et al. | |
| 2013/0080662 A1 * | 3/2013 | Bourque | 710/10 |

FOREIGN PATENT DOCUMENTS

| | | |
|---|---|---|
| DE | 4432589 A1 | 3/1996 |
| DE | 19521057 A1 | 12/1996 |
| EP | 0899889 A2 | 3/1999 |
| EP | 1150444 A1 | 10/2001 |
| GB | 2209429 A | 12/1995 |
| GB | 2308512 A | 6/1997 |
| WO | 2007/022297 A2 | 2/2007 |

OTHER PUBLICATIONS

Free Press Release. Reversible USB connector fits into ports either ways. Jun. 25, 2010.*

"Ibizia iFIPO Bluetooth Module with iPod Dock Connector for iPod Access"; http://www.amazon.com/Ibizia-iFIPO-Bluetooth-Connector-Accessories/dp/B00160QW, downloaded on Oct. 25, 2010, 6 pages.

"Customer Reviews: Ibizia iFIPO Bluetooth Module with iPod Dock Connector"; http://www.amazon.com/Ibizia-iFIPO-Bluetooth-Connector-Accessories/product-reviews, downloaded on Oct. 25, 2010, 5 pages.

"Customer Reviews: Anycom BluNa Bluetooth Nano iPod Adaptor"; http://www.amazon.com/Anycom-BluNa-Bluetooth-Nano-Adaptor/product-reviews/B00, downloaded on Oct. 25, 2010, 4 pages.

"Customer Reviews: ANYCOM FIPO Bluetooth Receiver—Bluetooth wireless..."; http://www.amazon.com/ANYCOM-FIPO-Bluetooth-Receiver-wireless-/product-reviews, downloaded on Oct. 25, 2010, 5 pages.

"AnyCom BluNa iPod Bluetooth Adapter—iPod Accessory Reviews by Mobile Tech Review"; http://www.mobletechreview.com/iPod/AnyCom-BluNa.htm, downloaded on Oct. 25, 2010, 3 pages.

* cited by examiner

| Pin | Connector 205 |
|---|---|
| 1 | Ground |
| 2 | Ground |
| 3 | DP Lane 0+ |
| 4 | USB D+ |
| 5 | DP Lane 0- |
| 6 | USB D- |
| 7 | DP Lane 1+ |
| 8 | Vbus |
| 9 | DP Lane 1- |
| 10 | Accessory ID |
| 11 | DP Hot Plug Detect |
| 12 | -- |
| 13 | Accessory Power |
| 14 | -- |
| 15 | Ground |
| 16 | Ground |
| 17 | -- |
| 18 | Accessory Receive |
| 19 | Accessory Transmit |
| 20 | Accessory Detect |
| 21 | Y/PR |
| 22 | C/Y |
| 23 | Comp/Pb |
| 24 | Rem_Sen |
| 25 | DP Auxillary Channel + |
| 26 | DP Auxillary Channel - |
| 27 | Audio Out Left |
| 28 | Audio Out Right |
| 29 | Audio Return |
| 30 | Ground |

ADAPTER FOR ELECTRONIC DEVICES

CROSS-REFERENCES TO RELATED APPLICATIONS

This application is a continuation of U.S. application Ser. No. 13/607,519, filed Sep. 7, 2012; which claims the benefit under 35 USC §119(e) to U.S. Provisional Patent Application No. 61/565,910, filed Dec. 1, 2011, which is incorporated by reference herein in its entirety for all purposes.

BACKGROUND OF THE INVENTION

Portable electronic devices, such as portable media players, have become ubiquitous in today's society. As they have proliferated, so have the number and types of hardware accessories that are designed to interact with these portable media players. These accessories range in complexity, including, for example, simple speaker systems and complex automotive entertainment systems.

These accessories commonly communicate with a portable media player using a connector system. This connector system typically includes a plug connector on the accessory and a receptacle connector on the portable media player. A user fits the plug connector of the accessory into the receptacle connector of the portable media player thereby forming physical and electrical connections between the contacts of each connector that allow data and power to be exchanged between the devices.

Users may have multiple different portable media players. For various reasons, these media players may have different sized connectors. For example, the media players may be made by different manufacturers. Also, the media players may be made by the same one manufacturer, but a newer media player may have a more advanced, smaller sized connector receptacle than an older media player manufactured by the same company.

For these and other reasons, a user may encounter a situation where she has a portable media players but that is incompatible with certain accessories designed to operate with a different media player.

BRIEF SUMMARY OF THE INVENTION

Embodiments of the present invention provide circuits, methods, and apparatus that provide compatibility among incompatible accessories and electronic devices such as portable media players. An exemplary embodiment of the present invention provides an adapter having a receptacle connector to mate with a plug connector attached to an accessory and a plug connector to mate with a receptacle connector on a portable media player. For convenience, the portable media player or other electronic device connected to the plug connector of the adapter is sometimes referred to herein as the host.

A plug connector on an accessory may be incompatible with a receptacle connector on a portable media player in at least two ways. First, this incompatibility may be physical; the plug connector of the accessory may not fit the receptacle connector of the portable media player. Second, this incompatibility may be electrical; signals or power received or provided at the plug connector of the accessory may be electrically incompatible with signals or power received or provided at the receptacle connector of the portable media player. In some instances the incompatibility is both physical and electrical.

Where the incompatibility is physical, an embodiment of the present invention provides an adapter having a connector receptacle to mate with a plug connector on an accessory and a plug connector to mate with a receptacle connector on a portable media player. One or more electrical connections may be made between pins of the plug connector and pins of the receptacle connector on the adapter. Where the incompatibility is electrical, an embodiment of the present invention provides one or more conversion circuits placed in the adapter between pins of the plug connector and pins of the receptacle connector on the adapter. Where the incompatibility is both physical and electrical, both these techniques may be employed by embodiments of the present invention.

Some portable media players include authentication circuitry that communicates with authentication circuitry in an accessory during a mating event to authenticate the accessory. If the authentication process is successful, the portable media player and accessory can exchange data and the accessory can be used to perform whatever function it was intended for. If the authentication fails, however, the portable media player disables communication with the accessory. Some embodiments of an adapter according to the present invention include circuitry that performs two levels of two levels of authentication. In a first level, the adapter authenticates itself to the portable media player using a first authentication protocol that the portable media player uses to authenticate accessories designed to operate with it. If the first authentication process is successfully completed and the adapter is permitted to communicate with the portable media player, a second level of authentication can then occur where the adapter authenticates the accessory connected to the adapter according to a second authentication protocol that the accessory would normally employ when connecting to a host that the accessory was designed to operate with. In one embodiment, the circuitry within the adapter can also set selected contacts of its receptacle connector to an open state and then connect the open contacts to appropriate circuitry after the first level of authentication is completed. Such an embodiment prevents an accessory connected to the receptacle connector from recognizing that it is connected to the adapter and potentially to the host until after the first level of authentication is completed.

One particular embodiment of the invention pertains to an adapter that includes a 30-pin receptacle connector that has a pinout compatible with Apple iPod and iPhone devices and an eight contact plug connector that includes a first pair of data contacts designated for the transmission of data using a differential data protocol, such as USB 2.0, and a second pair of data contacts designated for the transmission of data using either the Mikeybus protocol developed by Apple or a UART protocol. Conversion circuitry within the adapter converts signals and voltages received from an accessory device connected to the 30-pin receptacle connector into signals and voltages that can be transmitted over the eight contact plug connector and processed by a portable media player or other host device connected to the eight contact plug connector. The conversion circuitry also convert signals and voltages sent to the adapter by the host device via the eight contact connector to signals and voltages that can be transmitted over the 30-pin receptacle connector and processed by the accessory. In one particular embodiment the adapter includes circuitry that transmits data over the differential data contacts of the eight contact connector using a Mikeybus communication protocol that packs both digital audio and USB data together in a single data stream. The circuitry extracts the digital audio data from the data stream and sends it to a digital-to-analog converter to be output over left and right audio out contacts of the 30-pin connector. The circuitry can also extract the USB data and transmit it over the USB differential data contacts of the 30-pin connector.

Certain embodiments of the present invention provide an adapter that has a first connector that can be used to mate with a plug connector on an accessory. The adapter also includes a second connector that can be used to mate with a receptacle connector on the portable electronic device. As described above, the plug connector on the accessory is incompatible with the receptacle connector receptacle on the portable electronic device. The adapter can further include conversion circuitry adapted to convert signals received from the accessory to a format that can be transmitted to and processed by the portable electronic device and to convert signals received from the portable electronic device to a format that can be transmitted to and processed by the accessory. Additionally, the adapter may also include authentication circuitry adapted to implement a first level of authentication that authenticates the adapter to the portable electronic device. If the first level of authentication is successful, the authentication circuitry may then implement a second level of authentication that authenticates the accessory to the adapter.

In one embodiment, the first connector of the adapter includes (i) a first contact configured to receive an accessory ID signal, (ii) a pair of contacts configured to carry a universal serial bus (USB) signal, (iii) a second contact configured to carry power to the accessory from the portable electronic device, (iv) a third contact configured to carry an accessory detect signal to determine whether the accessory is coupled to the adapter, (v) a first set of differential data contacts, (vi) a second set of contacts configured to carry audio signals, and (vii) a third set of contacts configured to carry video signals.

In a particular embodiment, the second connector of the adapter includes (i) a first contact configured to carry identification signal to the portable electronic device, (ii) a first pair of data contacts configured to carry differential data signals, (iii) a second contact configured to carry a host power signal from the accessory to the portable electronic device, (iv) a third contact configured to carry accessory power from the portable electronic device to the accessory, (v) a second pair of data contacts configured to carry differential data signals, and (vi) a fourth contact coupled to a ground path.

An embodiment of the present invention provides a method for operating an adapter. The method includes the adapter sending identification and authentication information to a host device for authenticating the adapter to the host device. The method further includes the adapter detecting connection of an accessory device to the adapter and receiving identification and authentication information from the accessory. The method further includes the adapter authenticating the accessory and the adapter then enables a power path between the accessory and the host device based authentication of the accessory.

Another particular embodiment of the present invention provided an adapter for enabling connection between a portable electronic device and an accessory. The adapter includes a housing that has a first side and a second side. A first connector is disposed at the first side and a second connector disposed at the second side. The adapter further includes an identification device that is disposed in the housing and coupled to the first connector and a power control device that is disposed in the housing and coupled to the first and the second connector. The adapter further includes authentication circuitry coupled to the first connector and the second connector. The adapter can detect connection of a host device to the first connector and send authentication and identification information to the host device to authenticate the adapter to the host device. Thereafter, the adapter can detect connection of an accessory to the second connector and receive authentication information from the accessory. Based on the received information, the adapter can authenticate the accessory and enable communication between the accessory and the host device upon authenticating the accessory.

In some embodiments, the first connector of the adapter may have between 4 and 16 contacts arranged in two rows such that a first row of contacts is disposed on a upper surface of a printed circuit board (PCB) and a second row of contacts is disposed on a lower surface of the PCB. In a particular embodiment, the contacts are exposed to the environment. The first row and the second row may each have equal number of contacts. For example, if the first connector has 16 contacts, then each of the first row and the second row may have 8 contacts each arranged such that each contact on the upper surface of the PCB has another contact located directly underneath it on the lower surface of the PCB.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 6 illustrates an exemplary pinout 120 of a 30-pin receptacle connector that is included in a portable electronic device according to one embodiment of the present invention;

DETAILED DESCRIPTION OF THE INVENTION

Figure 1:
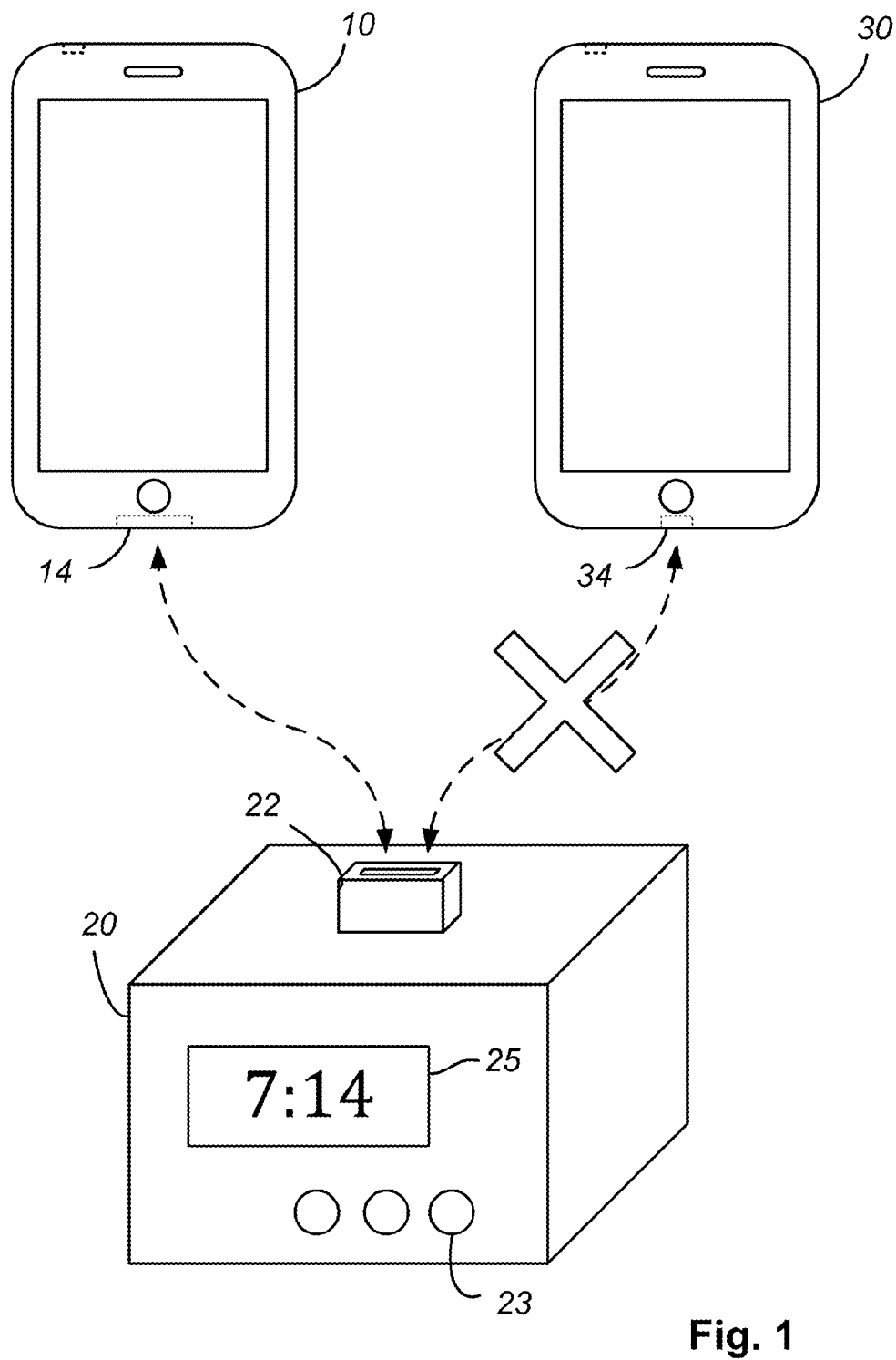
FIG. 1 illustrates an electronic system that is improved by the incorporation of an embodiment of the present invention.

FIG. 1 illustrates an electronic system that is improved by the incorporation of an embodiment of the present invention. Shown in FIG. 1 is a hardware accessory 20 that a user may want to connect to two different portable electronic devices 10 and 30 in order to, for example, extend the functionality of each of devices 10 and 30. In this example, portable electronic device 10 is a first portable media player that includes a receptacle connector 14 and a touchscreen 16. Portable media player 10 may be an iPod, iPhone, or similar device designed and manufactured by Apple Inc. of Cupertino, Calif., but it is to be understood that the present invention is not limited to any particular type of portable electronic media player or other device.

As shown in FIG. 1, accessory 20 is a clock radio. In other embodiments, the accessory may be an automotive radio, transmitter, cable, audio/video receiver, storage device, or other device. Accessory includes control buttons 24, such as volume, tuning, audio source, etc., for controlling the clock radio and a display 25 that can display the time and other information. Accessory 20 also includes a plug connector 22 that includes a plurality of contacts (not shown) that carry electrical signals for one or more of data, audio, video, control functions and power. In one embodiment plug connector 22 includes between 4 and 30 contacts but the present invention is not limited to any particular contact count or configuration.

Receptacle connector 22 includes a cavity in which plurality of pins or contacts (not shown) are positioned. Plug connector 14 and receptacle connector 22 are designed to mate with each other to physically and electrically couple the contacts in connector 14 with the contacts within connector 22 so that signals can be transmitted between the contacts. Thus, plug connector 14 and receptacle connector 22 can be said to be "compatible" with each other. When the connectors 14 and 22 are mated, portable media player 10 can exchange information with clock radio 20 to enable, for example, the clock radio to play music that is stored on media player 10.

Various portable media players and other electronic devices may include receptacle connectors that are a different shape, size or pin configuration than receptacle connector 14 in which case these other receptacle connectors may not be compatible with or may be "incompatible" with plug connector 22. A connector insert on an accessory may not be compatible with a connector receptacle on a portable electronic device or portable media player because the connector insert is designed to mate with products made by a first manufacturer, while the portable media player is instead made by a second manufacturer. Also, a portable media player manufacturer may change the design of a connector receptacle for some products, such as newer generation products. For example, a smaller connector may be incorporated into newer generation products to enable the design of smaller portable media players. Also, a connector with a different pinout may support new data communication protocols that could not be supported by an older legacy connector.

There are at least two types of incompatibility that may arise between a plug connector on an accessory and a receptacle connector on a host electronic device. First, the receptacle connector may be physically incompatible with the plug connector, that is, they may have incompatible sizes and literally cannot be connected together in a mechanical sense. FIG. 1 provides an example of connectors that are physically incompatible with each other. Specifically, a portable media player 30 is shown in FIG. 1 that includes a receptacle connector 34 that is considerably smaller than receptacle connector 14 incorporated within media player 10. Plug connector 22 is too large to fit within connector 24 and thus connectors 34 and 22 are "incompatible" connectors that cannot be mated with each other.

As a second example of incompatible connectors, a plug connector on an accessory may not be compatible with a receptacle connector on a portable electronic device or portable media player because one or more signals or power supply outputs on either the plug connector or receptacle connector are incompatible with inputs on the other end. This may occur at one or more levels of signaling. For example, a physical layer used to transmit and receive signals may be incompatible between the accessory and media player. Specifically, signal voltages and other physical parameters may be different. Also, a transport level, which specifies signal frequency and other parameters, may be different between the devices. The packet structure layer, which defines how commands and data are formatted, and the multi-packet logic levels, which define sequences of commands, may also vary among devices.

Embodiments of the present invention provide adapters that allow communication between a portable media player and an accessory, wherein a receptacle connector on the portable media player and a plug connector on an accessory are incompatible in one or both of these ways. One example is shown in FIG. 2 which illustrates an electronic system according to an embodiment of the present invention.

Figure 2:
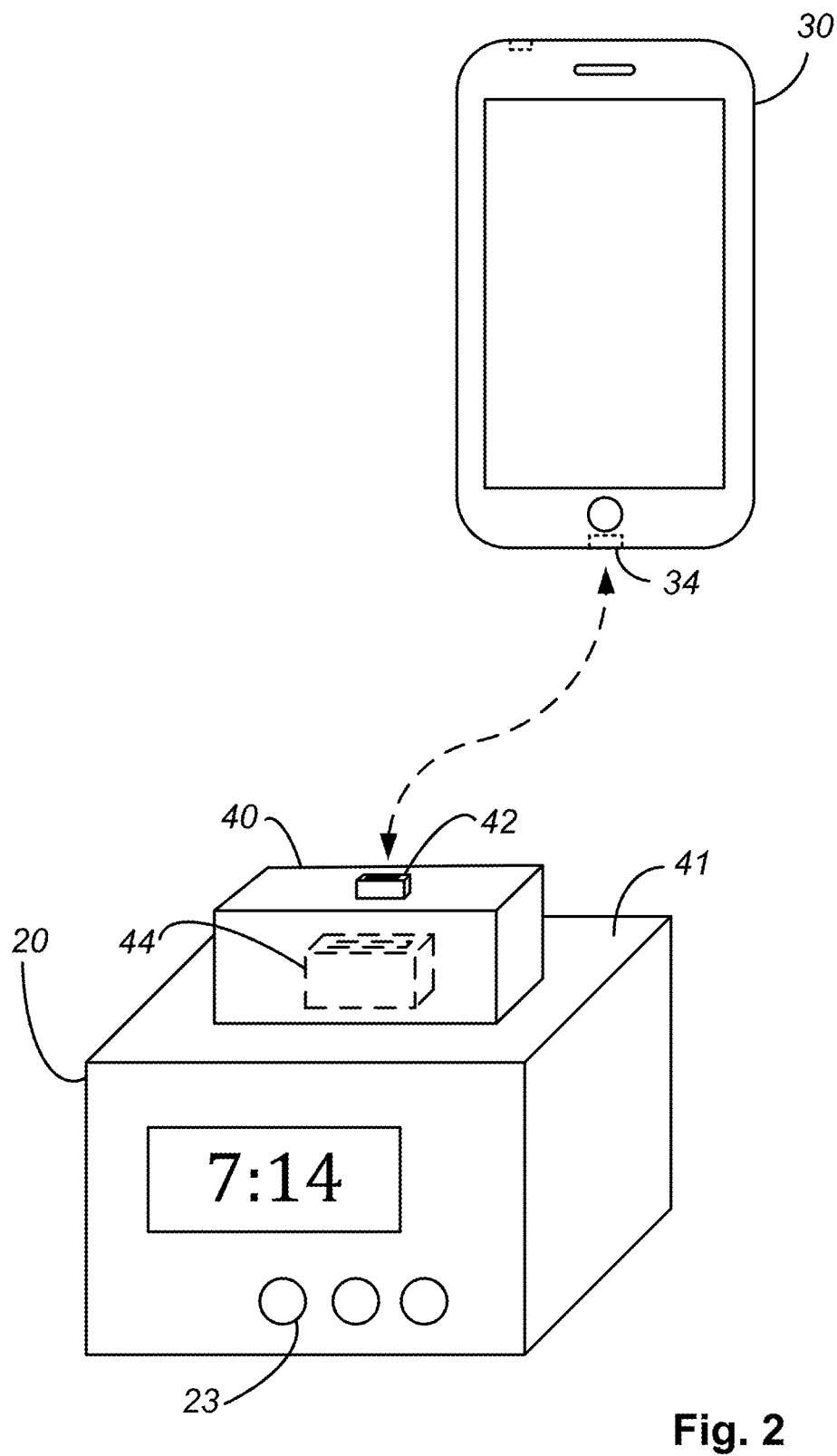
FIG. 2 illustrates an electronic system that includes an adapter 40 according to an embodiment of the present invention that allows communication between an accessory 20 and a portable media player 30.

As shown in FIG. 2 an adapter 40 according to the present invention can be connected between the otherwise incompatible connectors 22 and 34 of accessory 20 and portable media player 30, respectively, to allow accessory 20 and portable media player 30 to communicate with each other. Adapter 40 includes a receptacle connector 44 and a plug connector 42 formed in a housing 41. Receptacle connector 44 is configured to mate with and is thus compatible with plug connector 22 on accessory 20. Plug connector 42 is configured to mate with and is thus compatible with receptacle connector 34 on portable media player 30. Adapter 40 also includes conversion circuitry (not shown in FIG. 2) that converts signals and voltages received over receptacle connector 44 from accessory 20 into signals and voltages that can be transmitted over plug connector 42 and processed by portable media player 30. The conversion circuitry also converts signals and voltages sent to the adapter by portable media player 30 via plug connector 42 to signals and voltages that can be transmitted over receptacle connector 44 and processed by accessory 20.

Figure 3:
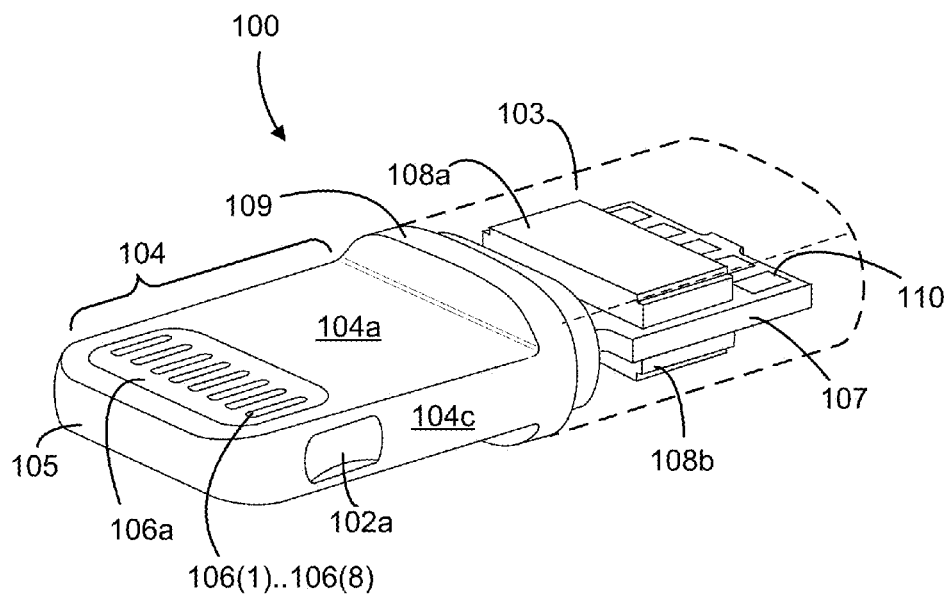
FIG. 3 illustrates a plug connector 100 that is included in an adapter according to one embodiment of the present invention.

In one particular embodiment, plug connector 42 is an eight contact (plug ground contacts) in-line dual orientation connector as shown in FIG. 3, which is a simplified perspective view of a plug connector 100 that can be used as plug connector 42. As shown in FIG. 3, connector 100 includes a body 103 and a tab portion 104 that extends longitudinally away from body 103 in a direction parallel to the length of the connector. Body 103 can be part of housing 41 of adapter 40 or can be a structural component of connector 100 that enables the connector to be attached to housing 41. Additionally, in come embodiments, adapter 40 may include a cable that extends from housing 41 to plug connector 42 providing more flexibility for the plug connector to be mated with a portable media device.

Tab 104 is sized to be inserted into a corresponding receptacle connector, such as receptacle connector 34 of portable media player 30 shown in FIG. 2, during a mating event and includes a first contact region 106a formed on a first major surface 104a and a second contact region 106b (not shown in FIG. 3) formed at a second major surface 104b (also not shown) opposite surface 104a. Surfaces 104a, 104b extend from a distal tip of the tab to a spine 109 that, when tab 104 is inserted into a corresponding receptacle connector, abuts a housing of the receptacle connector or host device the receptacle connector is incorporated in. Tab 104 also includes first and second opposing side surfaces 104c, 104d that extend between the first and second major surfaces 104a, 104b. In one particular embodiment, tab 44 is 6.6 mm wide, 1.5 mm thick and has an insertion depth (the distance from the tip of tab 44 to spine 109) of 7.9 mm.

The structure and shape of tab 104 is defined by a ground ring 105 that can be made from stainless steel or another hard conductive material. Connector 100 includes retention features 102a, 102b formed as curved pockets in the sides of ground ring 105 that double as ground contacts. Body 103 is shown in FIG. 3 in transparent form (via dotted lines) so that certain components inside the body are visible. As shown, within body 103 is a printed circuit board (PCB) 107 that extends into ground ring 105 between contact regions 106a and 106b towards the distal tip of connector 100. One or more integrated circuits (ICs), such as Application Specific Integrated Circuit (ASIC) chips 108a and 108b, can be operatively coupled to PCB 107 to provide information regarding connector 100 and adapter 40 and/or to perform specific functions, such as authentication, identification, contact configuration and current or power regulation.

As an example, in one embodiment an ID module is embodied within an IC operatively coupled to the contacts of connector 100. The ID module can be programmed with identification and configuration information about the connector and/or its associated accessory that can be communicated to a host device during a mating event. As another example, an authentication module programmed to perform an authentication routine, for example a public key encryption routine, with circuitry on the host device can be embodied within an IC operatively coupled to connector 100. The ID module and authentication module can be embodied within the same IC or within different ICs. As still another example, in embodiments where adapter 40 enables an accessory to charge the host device connected to connector 42, a current regulator can be embodied within one of IC's 108a or 108b. The current regulator can be operatively coupled to contacts that are able to deliver power to charge a battery in the host device and regulate current delivered over those contacts to ensure a constant current regardless of input voltage and even when the input voltage varies in a transitory manner.

Bonding pads 110 can also be formed within body 103 near the end of PCB 107. Each bonding pad can be connected to a contact or contact pair within regions 106a and 106b. Wires (not shown) can then be soldered to the bonding pads to provide an electrical connection from the contacts to circuitry within adapter 40. In some embodiments, however, bonding pads are not necessary and instead all electrical connections between the contacts and components of connector 100 and other circuitry within adapter 40 are made through traces on a PCB that the circuitry is coupled to and/or by interconnects between multiple PCBs within adapter 40.

As shown in FIG. 3 eight external contacts 106(1) . . . 106(8) are spaced apart along a single row in contact region 106a. A similar set of eight contacts are spaced apart along a single row in contact region 106b. The two rows of contacts are directly opposite each other and each contact in contact region 106a is electrically connected to a corresponding contact in contact region 106b on the opposite side of the connector. Contacts 106(1) . . . 106(8) can be used to carry a wide variety of signals including digital signals and analog signals as well as power and ground.

Figure 4A:
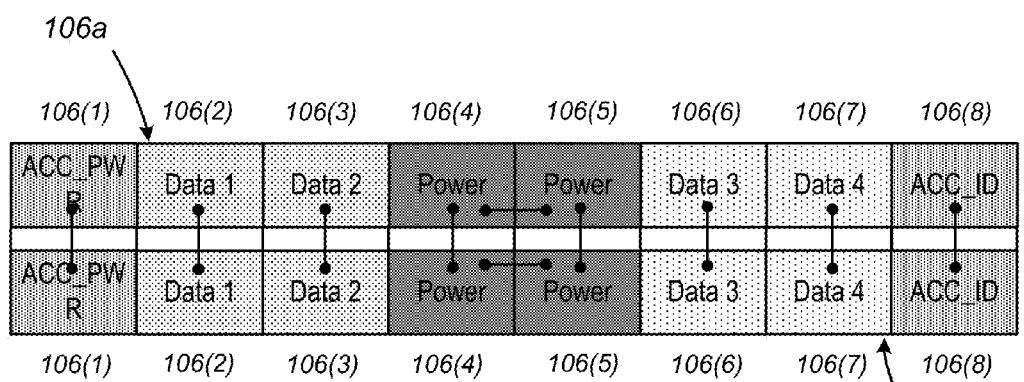
FIG. 4A illustrates an exemplary pinout of plug connector according to an embodiment of the present invention.

FIG. 4A depicts one particular implementation of a pinout for plug connector 100 according to one embodiment of the invention. The pinout shown in FIG. 4A includes two contacts 106(4), 106(5) that are electrically coupled together to function as a single contact dedicated to carrying power; an accessory ID contact 106(8); an accessory power contact 106(1); and four data contacts 106(2), 106(3), 106(6) and 106(7). Power contacts 106(4), 106(5) can be sized to handle any reasonable power requirement for a portable electronic device, and for example, can be designed to carry between 3-20 Volts from an accessory to charge a host device connected to connector 100. Power contacts 106(4), 106(5) are positioned in the center of contact regions 106a, 106b to improve signal integrity by keeping power as far away as possible from the sides of ground ring 105.

Accessory power contact 106(1) can be used for an accessory power signal that provides power from the host to an accessory. The accessory power signal is typically a lower voltage signal than the power in signal received over contacts 106(4) and 106(5), for example, 3.3 volts as compared to 5 volts or higher. The accessory ID contact provides a communication channel that enables the host device to authenticate the accessory and enables the accessory to communicate information to the host device about the accessory's capabilities as described in more detail below.

Data contacts 106(2), 106(3), 106(6) and 106(7) can be used to enable communication between the host and accessory using one or more of several different communication protocols. Data contacts 106(2) and 106(3) are positioned adjacent to and on one side of the power contacts, while data contacts 106(6) and 106(7) are positioned adjacent to but on the other side of the power contacts. The accessory power and accessory ID contacts are positioned at each end of the connector. The data contacts can be high speed data contacts that operate at rate that is two or three orders of magnitude faster than any signals sent over the accessory ID contact which makes the accessory ID signal look essentially like a DC signal to the high speed data lines. Thus, positioning the data contacts between the power contacts and the ID contact improves signal integrity by sandwiching the data contacts between contacts designated for DC signals or essentially DC signals.

Figure 4B:
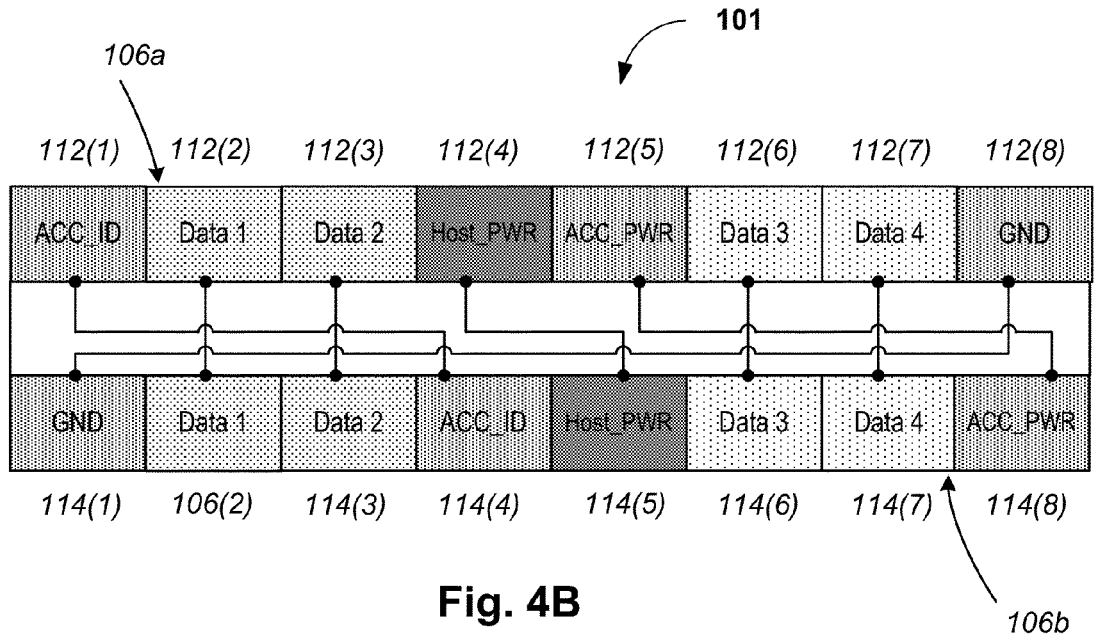
FIG. 4B illustrates an exemplary pinout of plug connector according to another embodiment of the present invention.

FIG. 4B depicts another particular implementation of a pinout for plug connector 100 according to one embodiment of the invention.

Connector 101 can be also a reversible connector just like connector 100. In other words, based on the orientation in which connector 101 is mated with a corresponding connector of a host device, either the contacts on the surface 106a or 106b are in physical and electrical contact with the contacts in the corresponding connector of the host device. As illustrated in FIG. 1E, connector 101 may have eight contacts arranged on an upper surface of a PCB 150 and eight contacts arranged on a lower surface of PCB 150.

Connector 101 includes two contacts 112(1) and 114(4) that can function as accessory ID contacts to carry the identification signals between the accessory and the portable electronic device. Contacts 112(1) and 114(4) are electrically connected to each other as illustrated in FIG. 1E. Connector 101 can have four pairs of data contacts, (a) 112(2) and 112(3), (b) 112(6) and 112(7), (c) 114(2) and 114(3), and (d) 114(6) and 114(7). In this particular embodiment, opposing data contacts, e.g., 112(2) and 114(2), are electrically connected to each other via PCB 150 as illustrated in FIG. 1E.

Connector 101 may further include host power contacts 112(4) or 114(5) that may be electrically connected to each other. Host power contacts 112(4) or 114(5) can carry power to the host device that is mated with connector 101. For example, plug connector 101 may be part of a power supply system designed to provide power to the host device. In this instance, either contact 112(4) or 114(5) may carry power from the power supply to the host device, e.g., to charge a battery in the host device.

Connector 101 may further include accessory power contacts 112(5) and 114(8) that may be electrically connected to each other, e.g., via PCB 150. Accessory power contacts carry power from the host device to a connected accessory. For example, in some instances, an accessory connected to the host device may not be self-powered and may derive its power from the host device. In this instance, the host device can supply power to the accessory over either of the accessory contacts, depending on the orientation of connector 101 with respect to a corresponding connector of the host device. Connector 101 may further include two ground contacts 112(8) and 114(1) electrically connected to each other. The ground contacts provide a ground path for connector 101.

Similar to connector 100 of FIG. 4A, the data contacts of connector 101 can be high speed data contacts that operate at rate that is two or three orders of magnitude faster than any signals sent over the accessory ID contact which makes the accessory ID signal look essentially like a DC signal to the high speed data lines. Thus, positioning the data contacts between the host power contacts and the accessory ID contact improves signal integrity by sandwiching the data contacts between contacts designated for DC signals or essentially DC signals.

Figure 5:
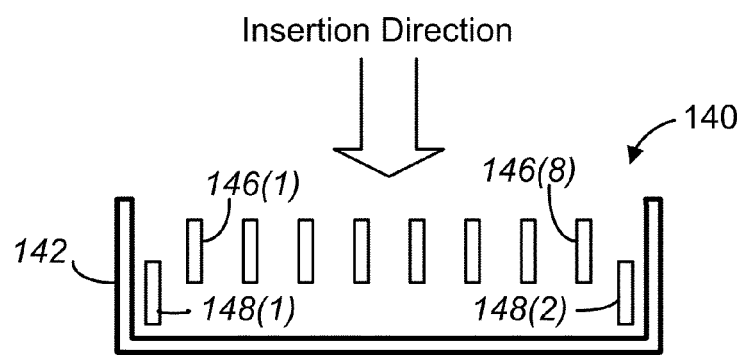
FIG. 5 illustrates a receptacle connector 140 that is compatible with plug connector illustrated in FIGS. 4A and 4B.

FIG. 5 depicts one embodiment of a receptacle connector 140 that connector 100 can be coupled with. Receptacle connector 140 can, for example, be included in portable media player 30 as connector 34. As shown in FIG. 15, receptacle connector 140 includes eight contacts 146(1) . . . 146(8) that are spaced apart in a single row. The contacts are positioned within a cavity 147 that is defined by a housing 142. Receptacle connector 140 also includes side retention mechanisms 146a, 146b that engage with retention features 102a, 102b in connector 100 to secure connector 100 within cavity 147 once the connectors are mated. Receptacle connector 140 also includes two contacts 148(1) and 148(2) that are positioned slightly behind the row of signal contacts and can be used to detect when connector 100 is inserted within cavity 147 and detect when connector 100 exits cavity 147 when the connectors are disengaged from each other.

When tab 104 of connector 100 is fully inserted within cavity 147 of receptacle connector 140 during a mating event between the plug and receptacle connectors, each of contacts 106(1) . . . 106(8) from one of contact regions 106a or 106b are physically coupled to one of contacts 146(1) . . . 146(8) depending on the insertion orientation of connector 100 with respect to connector 140. Thus, contact 146(1) will be physically connected to either contact 106(1) or 106(8) depending on the insertion orientation; data contacts 146(2), 146(3) will connect with either data contacts 106(2), 106(3) or with data contacts 106(7), 106(6) depending on the insertion orientation, etc.

Referring again to FIG. 2, in one particular embodiment, receptacle connector 44 is a 30-pin connector compatible with Apple iPod and iPhone devices, such as the iPhone 3 and iPhone 4. FIG. 6 depicts a pinout 120 of receptacle connector 44 according to one embodiment.

Figure 7:
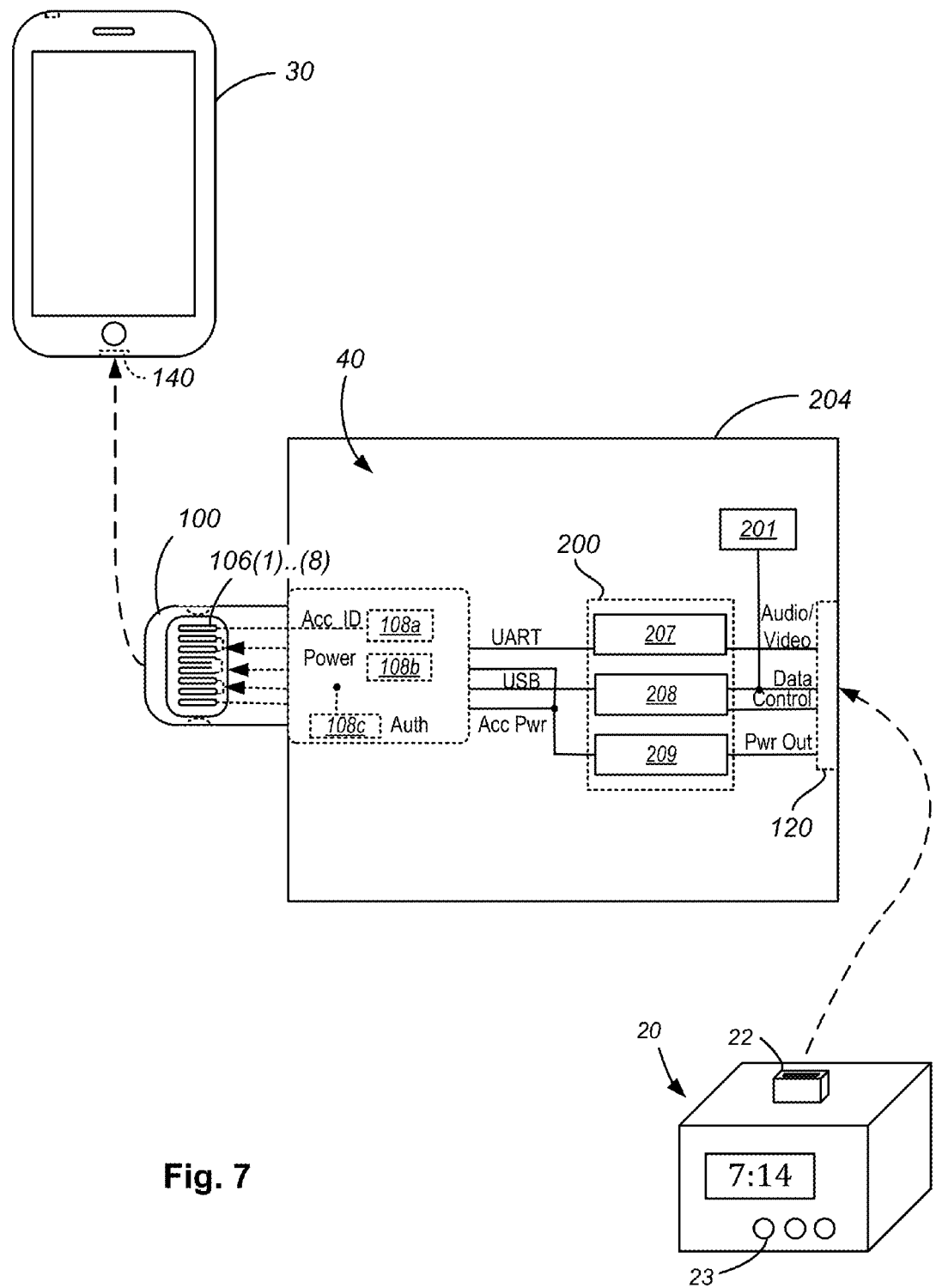
FIG. 7 illustrates an adapter according to the present invention that includes plug connector 100 of FIG. 3 along with the 30-pin receptacle connector having pinout shown in FIG. 6.

Reference is now made to FIG. 7 which illustrates a system according to the present invention in which an adapter 40 according to the present invention that can enable an accessory 20 that includes a 30-pin Apple compatible plug connector to communicate with a portable media player 30 that includes a receptacle connector 140 as shown in FIG. 5. Adapter 40 includes a plug connector 100 as shown in FIGS. 3 and 4 and a 30-pin receptacle connector 120 having pinout 44 shown in FIG. 6. Receptacle connector 120 is compatible with a plug connector 22 of an accessory 20, which is shown to be a docking station/clock radio but can be any electronic accessory that includes a plug connector that can be coupled to adapter 20. Plug connector 22 is physically incompatible with receptacle connector 140 (and thus receptacle connector 120 is also incompatible with plug connector 100). Adapter 40 allows accessory 20 to communicate with host 30.

As shown in FIG. 7, adapter 40 also includes conversion circuitry 200 within housing 204 that converts signals and voltages transmitted between accessory 20 and host 30 into signals and voltages that each of accessory 20 and host 30 can process and operate from. In one embodiment, conversion circuitry 200 includes an audio/video converter 207, a data converter 208 and a power converter 209. Other embodiments include only one or two of converters 207, 208 and 209 or include other types of converters altogether.

Audio/video converter 207 can be a one-way converter (e.g., only converts video and/or audio data sent from the host to a format that can be received and processed by the accessory or only converts video and/or audio data sent from the accessory to a format that can be received and processed by the host) or a two-way converter (i.e., converts video and/or audio data sent between the host and the accessory in both directions). In one particular embodiment, audio/video converter 207 is a one-way converter that converts digital audio and digital video data sent over USB data lines of connector 100 into analog audio and analog video signals. In another embodiment converter 207 only converts audio data and adapter 200 does not support the conversion of video data between host 215 and accessory 220.

Similarly, data converter 208 can be a one-way or two-way data converter. In one embodiment, data converter 208 is capable of translating data signals received over a first communication protocol used by accessory 20 and connector 205 to either a USB protocol or UART protocol used by connector 100 and host 30. In another embodiment, connectors 100 and 120 each support USB and UART communication protocols and data converter 208 passes USB signals between the two connectors without conversion but converts the UART signals received from each of host 30 and accessory 20 to a format appropriate for the other of host 30 and accessory 20. Data converter 208 can also process control and ID signals received over connector 120 as may be required to communicate with the accessory. Power converter 209 can convert a first DC voltage received from accessory 20 over connector 120 to a second DC voltage that can be transmitted to host 30 over connector 100, and can convert a third DC voltage received from the host 30 over connector 100 to a fourth DC voltage provided to the accessory 20 through connector 120.

The pinout of connector 100 includes one set of differential data contacts (e.g., USB 2.0 contacts) and one set of UART transmit/receive contacts or Mikeybus contacts as shown in FIG. 4A or 4B. The ID contact is coupled to an ID module 108a that includes a memory that stores information to inform the host that two of the data contacts are dedicated for USB 2.0 communication while the other two data contacts are dedicated to either UART or Mikeybus signals. A current regulator 108b is operatively coupled to the two centrally located power contacts 106(4), 106(5) to regulate current to the host when connector 120 is connected to an accessory or other device that enables charging.

In some embodiments adapter 40 can include two levels of authentication. In a first level, adapter 40 authenticates itself to host 30 through its connection to the host via connector 100 and connector 140. In one embodiment this level of authentication can be performed by an authentication module 108c over one of the sets of data contacts (either the USB or UART contacts) after the contacts in the host's receptacle connector are configured, and in another embodiment it can be done by an authentication module connected to the ID contact as an initial part of the handshaking algorithm between the host and adapter 40. After the adapter is authenticated and in communication with the host over connector 100, a second level of authentication can occur where an authentication processor 201 in adapter 40 authenticates accessory 20 connected to it via connector 120 and connector 22 according to an authentication protocol that accessory 20 would normally employ when connecting to a host that the accessory 20 was designed to operate with. In some embodiments a single authentication module can perform both the first and second levels of authentication.

In one particular embodiment where adapter 40 in FIG. 7 converts digital video data received over connector 100 to analog video data out sent over connector 120, the circuitry of adapter 40 is connected to contacts within connectors 100 and 120 as shown in Table 1 below.

TABLE 1

| Connector 100 Contacts | Adapter 200 Circuitry | Connector 120 Contacts |
| --- | --- | --- |
| USB: 202(2), 202(3) | Audio/Video Converter 207 | Contacts 21, 22, 23, 27, 28 |
| USB: 202(2), 202(3); UART: 202(6), 202(7) | Data Converter 208 | Contacts 4, 6, 10, 18, 19, 20, 24, 30 (used as iPod detect) |
| Pwr: 202(4), 202(5); Acc_Pwr: 202(1) | Power Converter 209 | Contacts 8, 13 |
| GND: Ground ring via side contacts | Ground | Contacts 1, 2, 15, 16, and 29 |
| N/A | No Connection | Contacts 3, 5, 7, 9, 11, 12, 14, 17, 25, 26 |

In another embodiment where adapter 40 does not support the conversion of video data, the contact-to-adapter circuitry connections set forth in Table 1 can be used expect that contacts 21, 22, and 23 are left in an open state and not connected to active circuitry within the adapter. Adapter 40 can also include a microcontroller (not shown in FIG. 7) that can communicate with accessory 20 using a protocol that the accessory would normally use to communicate with a host device that the accessory is compatible with. For example, in one embodiment adapter 40 includes a microcontroller that supports communication with accessory 20 using the iAP protocol employed by an Apple iPod or iPhone device. Some or all of the conversion circuitry 200 can be part of the microcontroller or it can be separate circuitry. The microcontroller can also set selected contacts of connector 120 (e.g., contacts 13, 18-20 and 30, which is used as iPod detect) to an open state so that the accessory does not recognize that it is connected to a host until after adapter 40 authenticates itself to the host and the host configures its contacts to allow communication between the host and adapter 40. Once the host and adapter are operatively connected and in full communication with each other, adapter 40 can connect the previously open/floating contacts with appropriate circuitry so that the accessory recognizes it has been connected to the adapter and can respond to any authentication requests from adapter 40 to initiate and complete a communication link between the adapter and accessory and then ultimately the host to the accessory via adapter 40.

Figure 8:
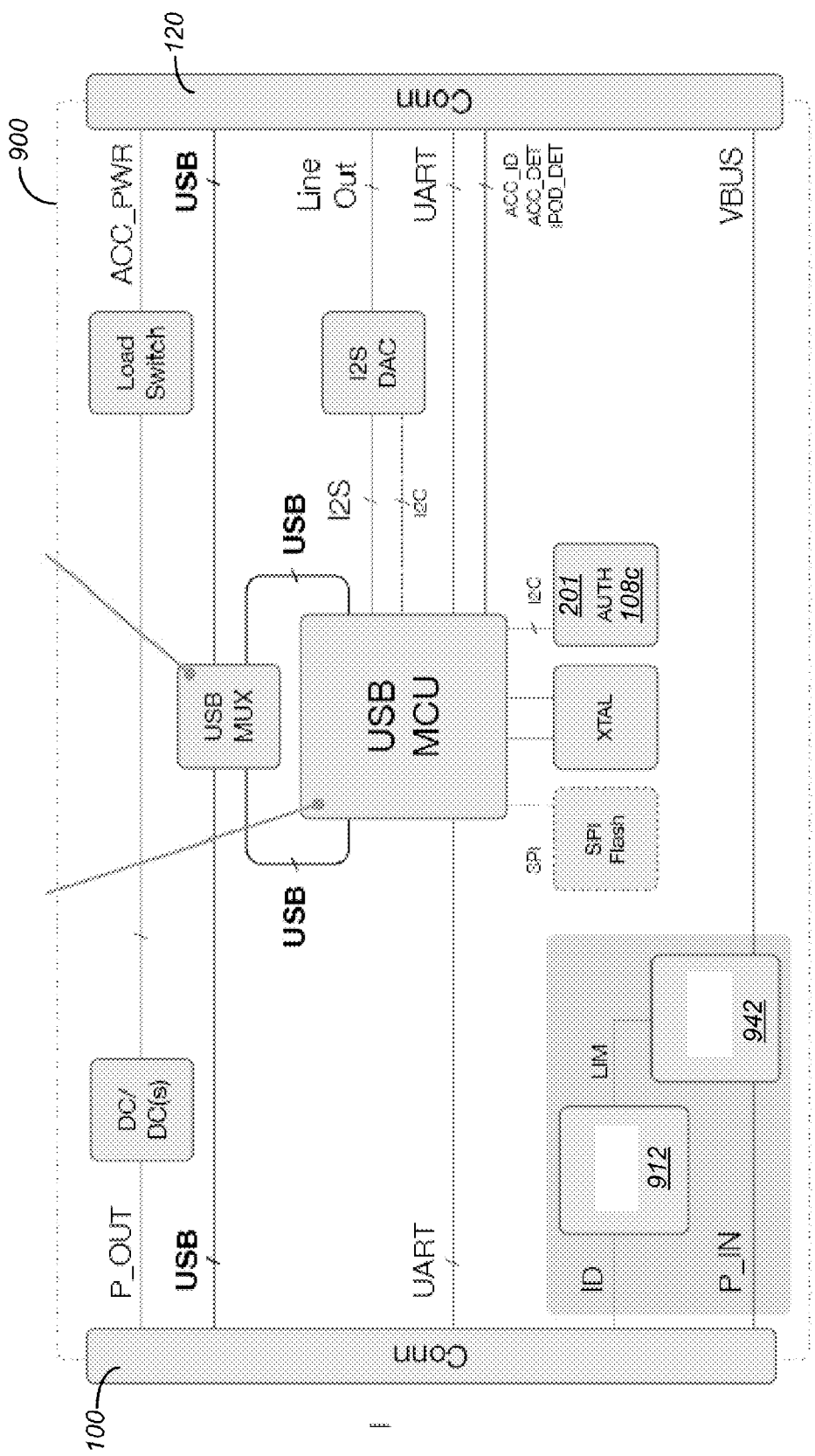
FIG. 8 is a schematic drawing of conversion circuitry 200 according to another embodiment of the present invention.
Figure 9:
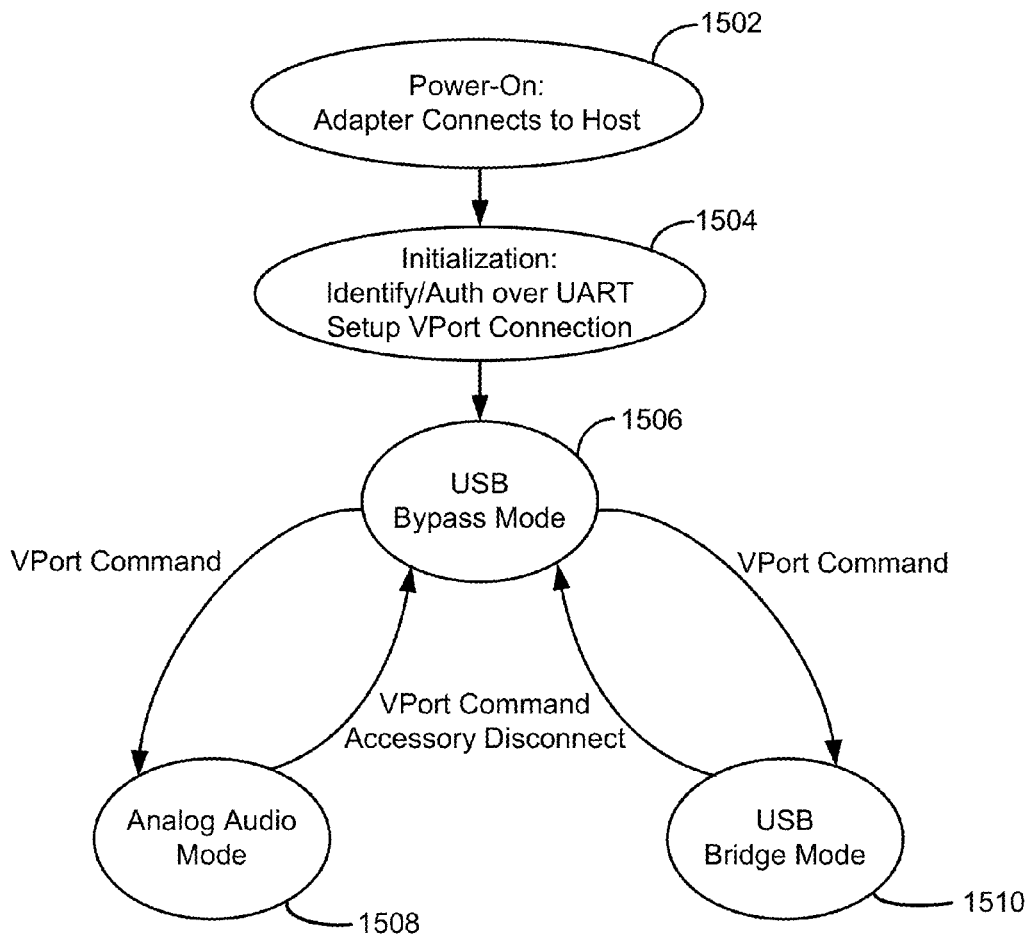
FIG. 9 is a state diagram showing a mode of operation for adapter 40 according to an embodiment of the present invention.

FIG. 8 is a schematic drawing of conversion circuitry 220 according to another embodiment of the present invention. Conversion circuitry 220 can be used in an adapter where one of the pairs of data contacts of connector 100 are USB contacts and the other of the pairs of data contacts are UART contacts. As shown in FIG. 9, conversion circuitry 220 includes a USB multiplexor that can be set to operate in a USB pass through mode, an audio mode or a USB bridge mode as discussed below.

FIG. 9 is a state diagram showing a mode of operation for an adapter that includes conversion circuitry as shown in FIG. 8 according to one embodiment of the present invention. As shown in FIG. 9, after initialization the adapter is always in one of three possible operating states: USB bypass mode, audio mode or USB bridge mode. An iAP command sent from accessory 30 can place the adapter in one of the three modes. USB bridge mode is the default mode that the adapter enters upon initialization. In USB bridge mode, the USB data lines on 30-pin connector 120 are directly connected to the USB data lines of connector 100. While in this mode, no analog audio is provided by the adapter so the digital-to-analog converter (DAC) can be shut down to save power. Also, since the USB lines pass directly through between connector 100 and connector 140, the conversion circuitry 220 need only monitor the UART ports of each connector. When the adapter is connected to the portable electronic device, the adapter may receive power from the portable electronic device and be in a powered on state 1502 ready to authenticate itself to the portable electronic device. Thereafter, the adapter can identify and authenticate itself to the portable electronic device. As part of the authentication process or following the authentication process, the adapter may set up the virtual port connection with the portable electronic device and be in an idle/ready state 1504. In some embodiments, the adapter may automatically transition to a default state 1506 upon being in idle/ready state 1504 for a predetermined time. As described above, in some embodiments, the default state may be the "bypass" mode. From the default state 1506, the adapter may either enter "bridge" mode state 1510 or the "analog audio" mode state 1508 after an accessory is connected to the adapter. The change of state can be effected by the portable electronic device. Upon disconnection of the accessory from the adapter, the adapter returns to default state 1506 and waits for the next mode change message.

Figure 10:
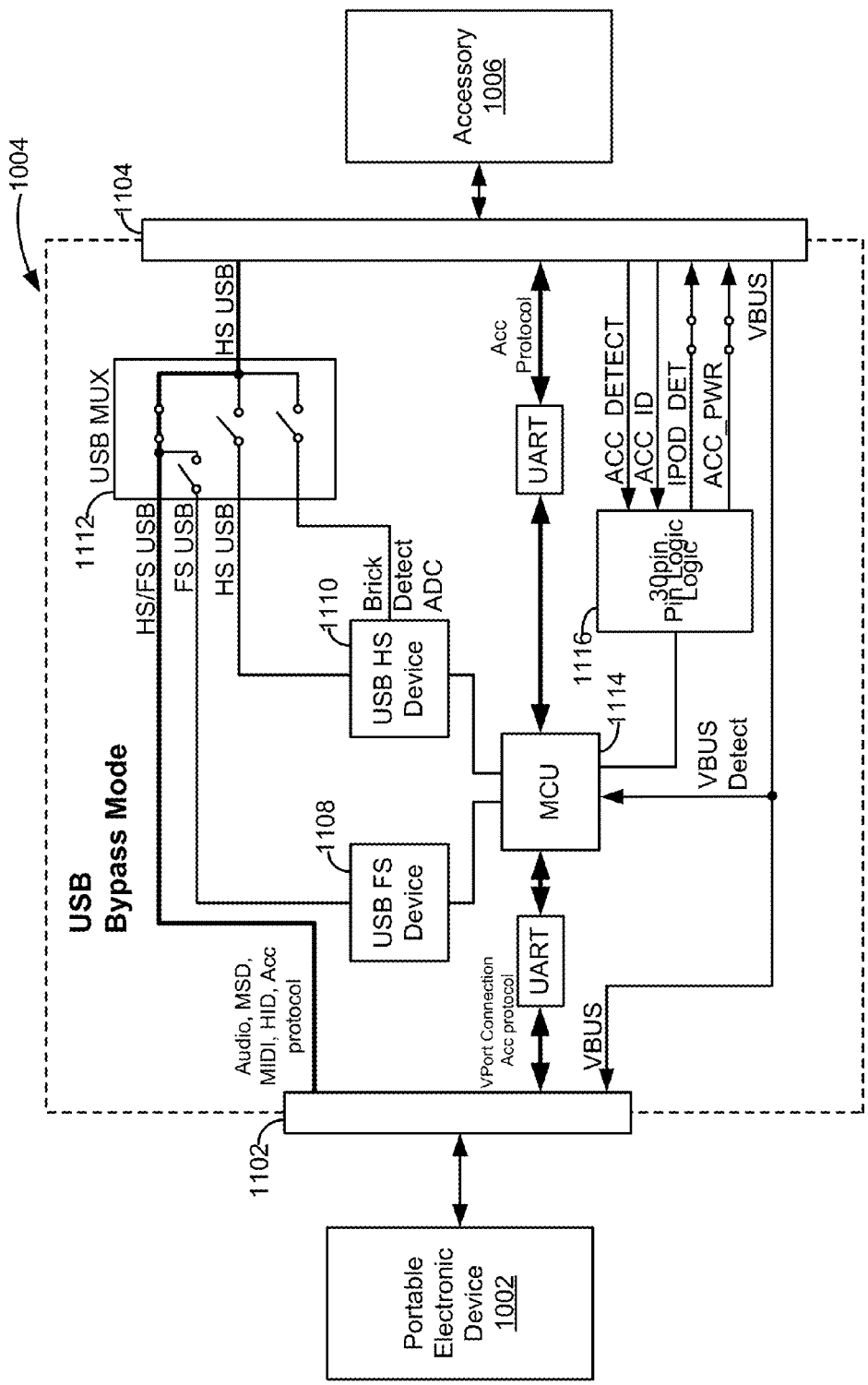
FIG. 10 is a representational drawing of conversion circuitry when the adapter is operating in a first mode of operation according to an embodiment of the present invention.

FIG. 10 is a representational drawing of conversion circuitry shown in FIG. 8 when the adapter is operating in the USB bypass mode of operation according to an embodiment of the present invention.

After adapter 1004 is connected to portable electronic device 1002, adapter 1004 may send identification and authentication information to portable electronic device 1002. Once authenticated, adapter is ready to receive accessory 1006 connected via port/connector 1104. Upon completion of the identification and authentication process described above, the portable electronic device may instruct the adapter to transition to the bypass mode. In some embodiments, the bypass mode may be the default mode that the adapter is placed in upon connection with the portable electronic device.

Once accessory 1006 is connected to connector 1104, adapter 1004 may receive accessory identification information from accessory 1006, e.g., via the ACC_Detect contact in connector 1104. Adapter 1004 then authenticates accessory 1006 based on the accessory identification information. Once accessory 1006 is authenticated, adapter 1004 can now relay information between accessory 1006 and portable electronic device 1002.

In some embodiments, first connector 1102 can be implemented as plug connector 100 of FIG. 3 and second connector 1104 can be implemented as connector 140 of FIG. 5. Both connectors are either formed in the housing of the adapter or attached to the housing. Adapter 1004 also includes a first USB device 1108 and a second USB device 1110. The two USB devices enable coupling of signals between connector 1102 and 1104 in various modes of operation described below. A USB multiplexer 1112 aids in selective activation of various signal paths within adapter 1004.

Controller 1114 can include, e.g., a microprocessor or microcontroller executing program code to perform various operations associated with adapter 1004. Controller 1114 controls the operation of adapter 1004 including, but not limited to receiving instructions from a connected portable electronic device for changing an operation mode of adapter 1004, selectively activating certain components/signal paths in conjunction with USB multiplexer 1112 to place adapter 1004 into the requested mode, and generally controlling the signal flow to and from connectors 1102 and 1104.

Logic circuitry 1116 may include an ASIC that receives signals from connector 1104, interprets the received signals and provides the information to controller 1114, which can then perform an action based on the received information. Logic circuitry 1116 can also receive inputs from controller 1114 and communicate information to a connected accessory via connector 1104.

Adapter 1004 may also process signals related to USB, analog audio, UART, power, and exchange of messages associated with an accessory protocol between a connected portable electronic device via connector 1102 and a connected accessory via connector 1104. In addition, adapter 1004 may also process one or more of the signals, e.g., as illustrated in FIG. 4B and FIG. 6.

It will be appreciated that the system configurations and components for adapter 1004 described herein are illustrative and that variations and modifications are possible. The adapter may have other components not specifically described herein. Further, while the adapter is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

When an accessory is capable of consuming analog audio but does not use the USB transport for iAP, the portable electronic device can place conversion circuitry 220 in analog audio mode. In this mode all iAP messaging is sent over the UART transport.

Figure 11:
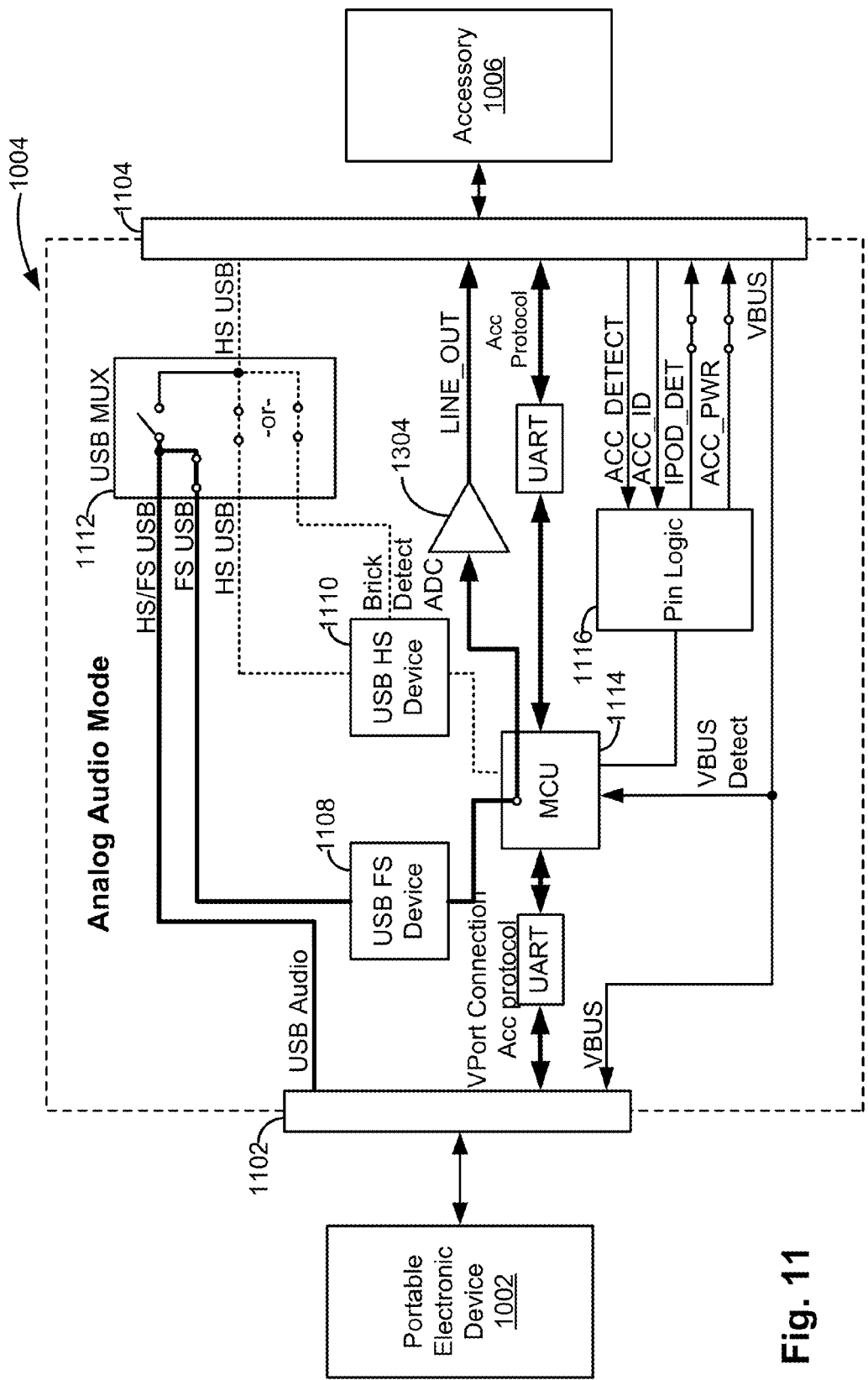
FIG. 11 is a representational drawing of conversion circuitry when the adapter is operating in a second mode of operation according to an embodiment of the present invention.

FIG. 11 is a representational drawing of an adapter 1004 including the conversion circuitry shown in FIG. 8 when the adapter is operating in the analog audio mode of operation according to an embodiment of the present invention. In this instance, upon connection accessory 1006 to adapter 1004, the portable electronic device may determine that accessory 1006, e.g., a speaker dock, supports analog audio input. Based on this determination, portable electronic device 1002 instructs adapter 1004 to enable the analog audio mode. In this mode, adapter 1004 enables USB device 1108 and connects to portable electronic device 1002 via the audio pin of connector 1104 by reconfiguring the connections in USB Mux 1112. USB device 1108 acts as a USB audio synchronization device. Portable electronic device 1002 outputs digital audio to the adapter via a data pin of connector 1102. Adapter 1004 then converts the digital audio using USB device 1108 and a digital to analog converter 1304 and outputs the analog audio over the line out pin of connector 1104. Accessory 1006 can then receive the analog audio and output the audio using, e.g., its speakers. If accessory 1006 is also able to provide charging voltage to the portable electronic device, the portable electronic device may also instruct the adapter to enable a charge path via the USB signal in this mode. In order to provide charging voltage to portable electronic device 1002, adapter 1004 enables USB device 1110 and couples it to the USB pin of connector 1104. This enables portable electronic device 1002 to receive charging voltage over the VBUS line as illustrated in FIG. 11.

If an accessory is capable of consuming analog audio and uses the USB transport for iAP messaging, the accessory can request to place conversion circuitry 220 in USB bridge mode. Both digital audio and accessory protocol (iAP) messages are sent over the USB lines. Circuitry 220 includes two USB devices, a full speed device and a high speed device. A multiplexor allows these devices to be switched to the USB data lines of connector 120 as needed.

Figure 12:
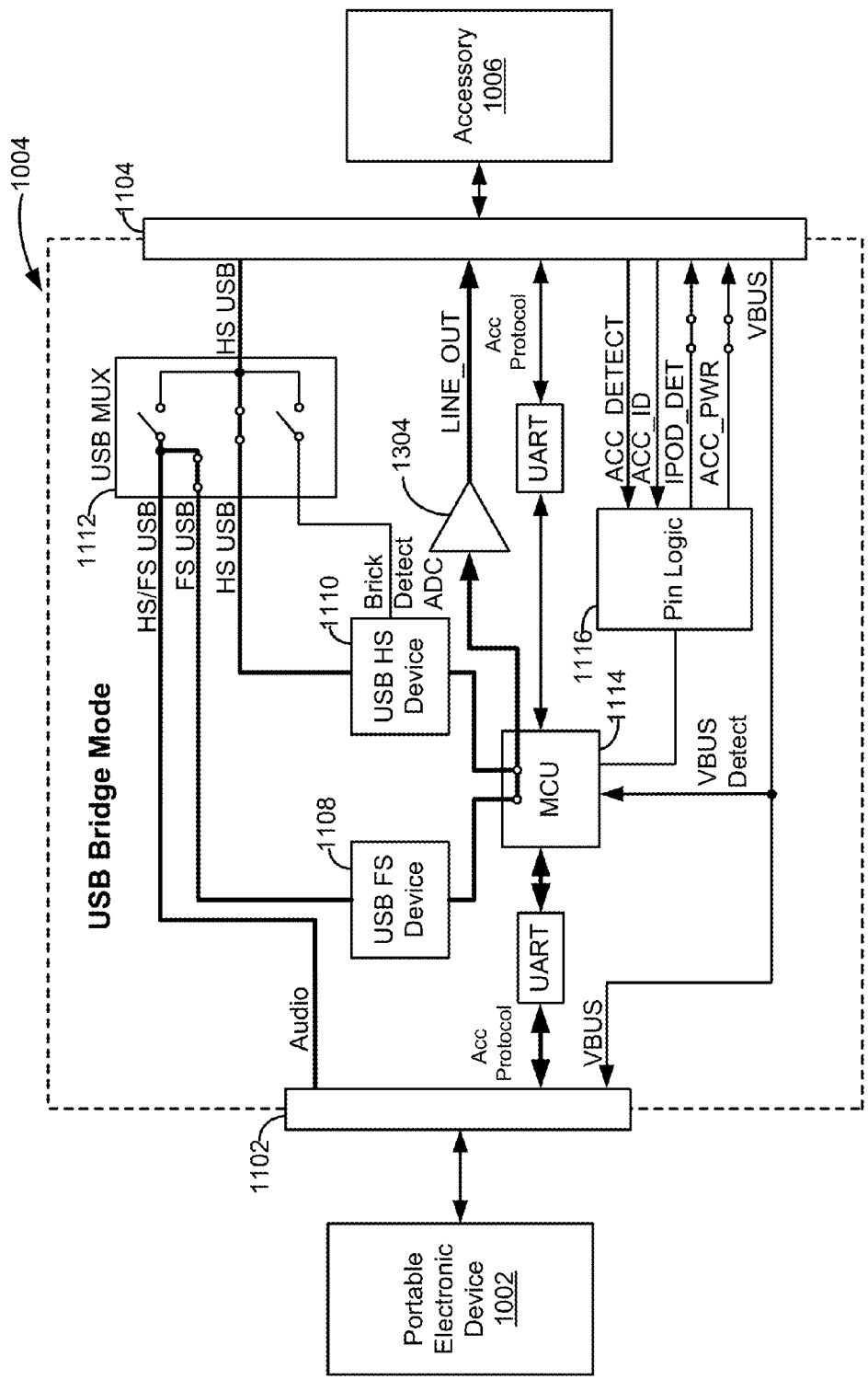
FIG. 12 is a representational drawing of conversion circuitry when the adapter is operating in a third mode of operation according to an embodiment of the present invention.

FIG. 12 is a representational drawing of conversion circuitry when the adapter is operating in the USB bridge mode of operation according to an embodiment of the present invention. This mode may support an accessory 1006 that needs to communicate with the portable electronic device using the accessory protocol over the USB data line and also requests analog audio.

Initially when accessory 1006 is connected to adapter 1004, the adapter may be in the "bypass" mode discussed above and accessory 1006 can directly communicate with portable electronic device 1002. As part of this communication, the portable electronic device can determine the type of accessory connected and its operating requirements. If portable electronic device 1002 determines that accessory 1006 requests communication using the accessory protocol over the USB line and analog audio input, the portable electronic device instructs the adapter to enable the bridge mode. The portable electronic device then enters a host mode. In some embodiments, the adapter may disable connector 1104 (thereby disconnecting the accessory) prior to entering the bridge mode. After entering the bridge mode, the adapter then re-enables connector 1104 so that the accessory can communicate with the portable electronic device. In this mode, USB device 1108 is coupled to the audio output of the portable electronic device via USB Mux 1112. USB device 1108 is also coupled to USB device 1110 via controller 1114. USB device 1110 is coupled to the USB data line of connector 1104 via USB Mux 1112. USB device 1108 is also coupled to an audio input pin of connector 1104 via controller 1114 in order to process the audio data.

In operation, USB device 1108 may receive data from the portable media device via connector 1102. USB device 1108 cannot communicate directly with USB device 1110. Hence, controller 1114 receives the data from USB device 1108 and forwards the data to USB device 1110. In some embodiments, the two USB devices may operate using different protocols. For example, USB device 1108 may be a full-speed USB device while USB device 1110 may be a high speed USB device. Alternatively, one of the USB devices may use version 1.1 protocol and the other USB device may use version 2.0 or 3.0 protocol. In such instances, direct data transfer between the two USB devices may not be possible. Controller 1114 acts as a "bridge" to properly convert the received data to the appropriate format before sending it to the portable media device and/or the accessory.

In operation, the portable electronic device outputs digital audio data using a USB audio output pin of connector 1102. The digital audio data is processed by USB device 1108 and microcontroller 1114 and converted to analog audio. The analog audio is then input to the accessory via the audio input pin of connector 1104.

If accessory 1006 wants to send any messages to the portable electronic device, e.g., for invoking some functionality of the portable electronic device or any other digital data, the message/data is output over the USB data pins of connector 1104. The message/data is then processed by USB device 1110 and sent to controller 1114. Controller 1114 acts as a bridge to transfer the message/data to USB device 1108. USB device 1108 then communicates the message/data to portable electronic device 1002 over the same USB audio pin of connector 1102.

If the portable electronic device wants to send message/data to the accessory, then the same path in reverse can be followed. Thus, portable electronic device 1002 can output audio and other non-audio data using the same USB data lines and accessory 1006 can receive the messages/non-analog audio data on its USB lines and receive analog audio data on its audio input line.

A USB device can only communicate with a USB host. In the bridge mode, both the accessory and the host device act as USB hosts in order to communicate with the two USB devices 1110 and 1108, respectively. As described above, the two USB devices cannot directly communicate with each other. In the bridge mode, the adapter effectively communicates data between the accessory and the host device by properly processing the data as needed.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An adapter for providing a communication path between a portable electronic device and an accessory, the adapter comprising:
    a first connector to mate with a plug connector on a first device;
    a second connector that is incompatible with the first connector, the second connector being configured to mate with a receptacle connector on a second device in either of two orientations rotated 180 degrees from each other, the second connector including a first set of eight external contacts spaced apart along a first row on a first side of the second connector and a second set of eight external contacts spaced apart along a second row on a second side of the second connector opposite the first side, the first set of contacts including first and second data contacts coupled to first and second data contacts, respectively, in the second set of contacts; and
    conversion circuitry configured to convert signals received from the first device to a format that can be transmitted to and processed by the second device and to convert signals received from the second device to a format that can be transmitted to and processed by the first device;
    identification circuitry configured to indicate a communication protocol used by the first and second data contacts to the second device; and
    authentication circuitry configured to implement a first level of authentication that authenticates the adapter to the second device and, if the first level of authentication is successful, implement a second level of authentication that authenticates the first device to the adapter.

2. The adapter of claim 1 wherein the first connector includes thirty contacts.

3. The adapter of claim 2 wherein the thirty contacts of the first connector include an ID contact configured to receive an accessory ID signal, a pair of contacts configured to carry a universal serial bus (USB) signal, a power contact, a plurality of ground contacts, an accessory detect contact configured to carry an accessory detect signal, and a pair of analog audio contacts configured to carry left and right audio signals.

4. The adapter of claim 1 wherein the each contact in the first set of eight contacts in the second connector is coupled to a contact in the second set of eight contacts in the second connector.

5. The adapter of claim 4 wherein the first set of eight contacts further includes an ID contact configured to carry identification signal, third and fourth data contacts, and a power contact configured to carry a host power signal from the first device to the second device.

6. The adapter of claim 5 further comprising a current regulator operatively coupled to the power contact in the first set of eight contacts to regulate current to the second device when the first connector is connected to a device that enables charging.

7. The adapter of claim 4 wherein the first and second data contacts function as a first pair of high speed data contacts and the third and fourth data contacts function as a second pair of high speed data contacts and a rate of data carried by each of the first and second pairs of data contacts is two or more orders to magnitude higher than a rate at which information is transmitted over the ID contact in the first set of eight contacts.

8. The adapter of claim 2 further comprising circuitry that sets at least some contacts in the thirty contacts of the first connector to an open state until after the adapter authenticates itself to the second device.

9. The adapter of claim 1 wherein the authentication circuitry comprises:
    an identification device configured to provide identification information of the adapter to the portable electronic device; and
    a power control device configured to control a power path between the accessory and the portable electronic device.

10. The adapter of claim 9 wherein each of the identification device and the power control device are implement as a single integrated circuit (IC) chip.

11. An adapter for providing a communication path between a portable electronic device and an accessory, the adapter comprising:
    a first connector to mate with a plug connector on a first device, the first receptacle connector having thirty contacts including a first pair of USB differential data contacts, a first power contact and left and right audio contacts;
    a second connector that is incompatible with the first connector, the second connector being configured to mate with a receptacle connector on a second device in either of two orientations rotated 180 degrees from each other, the second connector including a first set of eight external contacts spaced apart along a first row on a first side of the second connector and a second set of eight external contacts spaced apart along a second row on a second side of the second connector opposite the first side, wherein each contact in the first set of contacts is coupled to a contact in the second set of contacts and the first set of contacts includes a second pair of USB differential data contacts and a second power contact;

identification circuitry configured to indicate to the second device a communication protocol used by at least some contacts in the second connector;

authentication circuitry configured to implement a first level of authentication that authenticates the adapter to the second device and, if the first level of authentication is successful, implement a second level of authentication that authenticates the first device to the adapter; and conversion circuitry configured to, if the first and second levels of authentication are successfully implemented: (i) convert audio signals received from the first device over the left and right audio contacts to a format that can be transmitted to and processed by the second device, convert audio signals received from the second device to a format that can be transmitted over the left and right audio contacts to and processed by the first device, (ii) exchange data between the first and second devices over the first and second pairs of USB differential data contacts, and (iii) enable a power path between the first and second devices.

12. The adapter of claim 11 further comprising switching circuitry that sets at least some contacts in the thirty contacts of the first connector to an open state prior to the adapter authenticating itself to the second device.

13. The adapter of claim 12 wherein after the adapter is authenticated to the second device, the switching circuitry connects at least some of the at least some contacts in the thirty contacts of the first connector to other circuitry within the adapter.

14. The adapter of claim 13 wherein the thirty contacts of the first connector further includes a pair of receive and transmit contacts and an accessory detect contact each of which is set to an open state by the switching circuitry prior to the adapter authenticating itself to the second device and each of which is then subsequently connected to other circuitry upon the adapter and second device being operatively coupled to each other.

15. The adapter of claim 11 further comprising a housing having a first side and a second side, opposite the first side; and wherein the first connector is disposed at the first side of the housing and the second connector is disposed at the second side of the housing.

16. A method of using an adapter to enable an accessory electronic device having a first connector to exchange data with a host electronic device having a second connector that is incompatible with the first connector, the method comprising:

sending identification and authentication information from the adapter to the host device to enable the host to perform a first level of authentication that authenticates the adapter to host device upon mating a plug connector on the adapter to the second connector of the host device;

if the adapter is successfully authenticated by the host device, receiving identification and authentication information from the accessory and performing a second level of authentication at the adapter to authenticate an accessory electronic device connected to the adapter; and after the first and second levels of authentication are successfully completed, enabling a power path between the accessory device and the host device.

17. The method of claim 16 wherein:

the receptacle connector on the adapter includes thirty pins;

the plug connector on the adapter is configured to mate with the receptacle connector on the accessory device in either of two orientations rotated 180 degrees from each other; and the plug connector on the adapter includes a first set of eight external contacts spaced apart along a first row on a first side of the second connector and a second set of eight external contacts spaced apart along a second row on a second side of the second connector opposite the first side, the first set of contacts including first and second data contacts coupled to first and second data contacts, respectively, in the second set of contacts.

18. The method of claim 16 wherein after the first and second levels of authentication are successfully completed, the adapter enables data to be exchanged between the accessory device and the host device over the first and second data contacts.

19. The method of claim 18 wherein enabling the power path further comprises sending a signal to a power control device disposed within the adapter based on receiving the identification information from the accessory device.

20. The method of claim 16 further setting an accessory detect contact in the thirty contacts of the first connector to an open state prior to the adapter authenticating itself to the second device and, after the adapter is authenticated to the second device, connecting the accessory detect contact to other circuitry within the adapter.

* * * * *